United States Patent [19]

Silverman et al.

[11] 4,213,038
[45] * Jul. 15, 1980

[54] ACCESS SECURITY SYSTEM

[76] Inventors: Daniel Silverman, 5969 S. Birmingham Ave., Tulsa, Okla. 74105; Everett A. Johnson, 15 S. Prospect Ave., Park Ridge, Ill. 60068

[*] Notice: The portion of the term of this patent subsequent to Jun. 18, 1991, has been disclaimed.

[21] Appl. No.: 752,568

[22] Filed: Dec. 20, 1976

[51] Int. Cl.² .......................... G06K 5/00; G07F 7/08
[52] U.S. Cl. ...................................... 235/382; 235/381
[58] Field of Search .................... 235/61.11 E, 61.7 B, 235/61.7 R, 382, 381; 340/149 A

[56] References Cited
U.S. PATENT DOCUMENTS

| 3,677,465 | 7/1972 | Johnson et al. | 235/61.7 B |
| 3,818,190 | 6/1974 | Silverman et al. | 235/61.7 B |
| 3,829,661 | 8/1974 | Silverman et al. | 235/61.7 B |

Primary Examiner—Daryl W. Cook

[57] ABSTRACT

This invention describes a system for access control, wherein a control card is presented to a control means. If the control card is authenticated, then access is gained. If it is not authenticated, access is not gained, the control card is retained, and an alarm may be sounded.

The control card contains at least two means; (1) machine readable indicia identifying the card, and (2) a random pattern of micro spots, which pattern is derived (by direct copying—such as by focussed laser beam) from one of a plurality of different patterns, retained in a bank of such micro patterns, each such micro pattern identified by, and selectable in accordance with, different unique indicia, identical with the machine readable indicia on said cards.

In use the control card is introduced into the control means and the indicia are read. Master micro pattern corresponding to the indicia is selected from the bank. The card micro pattern and master micro pattern are compared. If the comparison okay, the card is authenticated.

12 Claims, 3 Drawing Figures

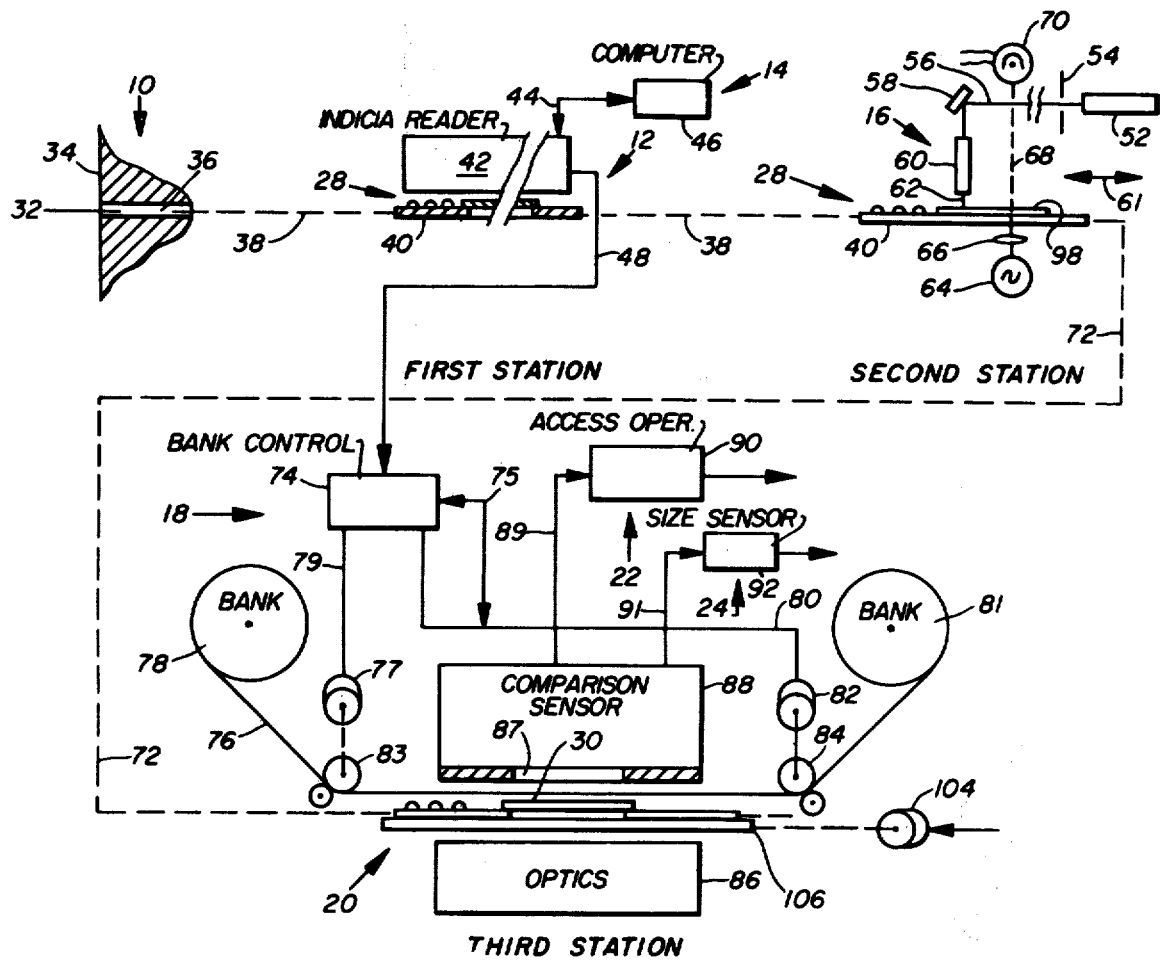
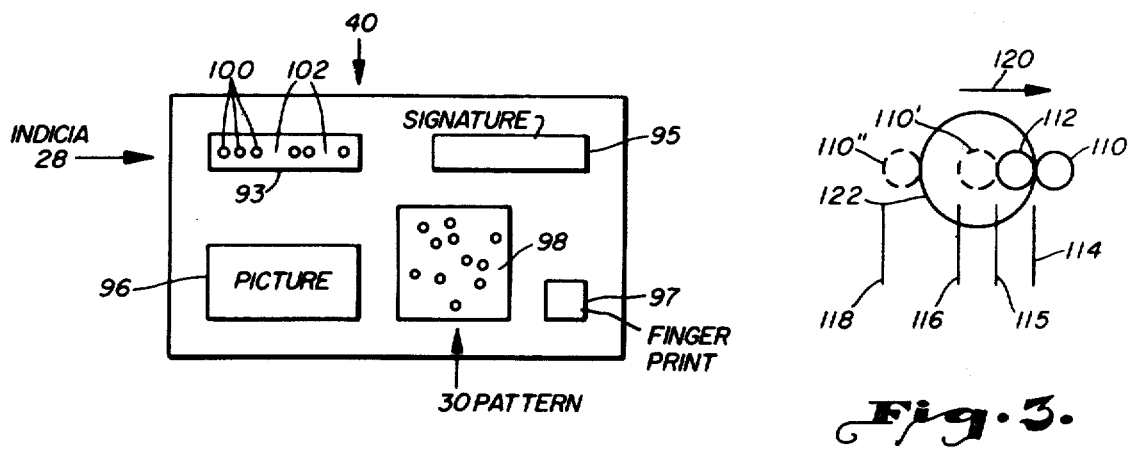

ACCESS SECURITY SYSTEM

CROSS REFERENCE TO RELATED PATENT AND APPLICATIONS

This application is a continuation-in-part of copending application Ser. No. 495,632, now U.S. Pat. No. 3,999,042 filed Aug. 8, 1974, as a continuation-in-part of our antecedent application Ser. No. 272,739, filed July 18, 1972, now U.S. Pat. No. 3,829,661, entitled ACCESS CONTROL SYSTEM, which in turn is a continuation-in-part of our earlier application Ser. No. 74066, filed Sept. 21, 1970, entitled METHOD AND APPARATUS FOR AUTHENTICATION OF INFORMATION RECORDS, now U.S. Pat. No. 3,677,465.

A related patent is our U.S. Pat. No. 3,818,190, granted June 18, 1974, on our application Ser. No. 272,686, filed July 17, 1972, entitled AUTHENTICATION OF ACCESS TO INFORMATION RECORDS.

BACKGROUND OF THE INVENTION

This invention is in the field of control cards for gaining access. More particularly it is for gaining access to a restricted area, or access to restricted material or papers, or access to money, tickets, checks and the like.

In the prior art there have been many types of control cards described. All of these attempt, in one way or another, to provide some crucial test, which can be preformed on the card so as to determine whether it is authentic, or a copy or forgery. All of the physical properties of the prior art cards were capable of being copied, and therefore the tests of validity or authentication were of little value.

SUMMARY OF THE INVENTION

It is a principle object of this invention to provide an access control system which is selective and which is extremely difficult or impossible to duplicate. It is a further object of this invention to provide an access control system which is self protective in that it has plural means to detect forgeries.

These and other objects are realized and the limitations of the prior art devices are overcome in this invention, in which the authentication is obtained by precise comparison of a random spot pattern with an identical one, from which the first one was derived. The spots in the pattern are microspots, too small to be seen with the naked eye, and recorded in a suitable sheet material by copying through microperforations in a master micro pattern, by means of a focussed laser beam.

Because of the extremely small size of the spots, the pattern can not be copied by a stop-position-print system.

Furthermore the sheet material must have a thickness and melting point such that it will withstand, without melting, the passage of a focussed laser beam of a selected intensity.

The pattern can not be copied photographically, since the photographic material will not withstand the laser beam.

The pattern can not be copied photographically and etched, since the microperforations will not be of the correct size.

They can only be copied from the mater pattern by passage of a focussed laser beam over the microperforations in the master pattern card.

In the use of the control card, it is inserted into control unit.

It is then advanced to a first station where the indicia are read. At this point the indicia are compared to a prior list of indicia which are indicated as unacceptable. If the indicia are okay it then goes to the second station.

At the Second Station the card is scanned by a focussed laser beam of a specified intensity level. This level is just below the level which will burn the pattern sheet of the valid cards. If the pattern sheet of the card is not burned, as evidenced by a photoelectric system for detecting major perforations in the pattern sheet, the card then goes to the third station.

At the Third Station the micro pattern on the card is compared to a selected master pattern which corresponds to, and has been selected from a bank of master patterns in accordance with the indicia read from the card.

Two tests are made at this station. The first is to compare the pattern on the card with the master pattern. If this checks, then the second test is made.

In the second test, the sizes of the microperforations in the pattern sheet are compared to the size of the microperforations in the master card. This can be done by slowly shifting the position of one pattern with respect to the other, at a selected constant speed, and measuring the time that light passes through any selected spot, as plurality of spots.

If the card passes this test, then it is considered authentic and the appropriate operative mechanism is activated to provide the access requested. Also the card is returned to the owner who first inserted into the control apparatus.

Not all of these tests may be required. The principal test, is of course, the comparison of the patterns in station 3 test (a), the master pattern having been selected on the basis of indicia read in the First Station. Also, other tests may be provided, including, for example, comparing a photograph on the card with the person presenting the card, or comparing finger prints, etc.

BRIEF DESCRIPTION OF THE DRAWINGS

These and other objects of this invention and a better understanding of the principles and details of the invention will be evident from the following description taken in conjunction with the appended drawings, in which:

FIG. 1 illustrates a type of access card useful in this system.

FIG. 2 illustrates the preferred embodiment of the access system of this invention.

FIG. 3 illustrates the test for perforation size.

DESCRIPTION OF THE PREFERRED EMBODIMENT

Referring now to the drawings, numeral 10 indicates generally the card input station, numeral 12 indicates generally the First Station, numeral 14 indicates computer apparatus to check the indicia against a prepared list of indicia, numeral 16 indicates the Second Station, numeral 18 the Third Station, 20 indicates the pattern comparison means, 22 the operative means responsive to the validation means, 24 the perforation size measurement means, 26 the access control card, 28 the machine readable indicia on the control card, and 30 the pattern of microperforations by means of which the control card will be validated or authenticated.

Our U.S. Pat. No. 3,677,465, entitled Method and Apparatus for Authentication of Information Records, which is made part of this application by reference, will be depended on for much of the apparatus to be described.

Also, there will only be schematic diagrams given of the physical apparatus, such as the case, the card handling means, and the operative means which actually accomplishes the access. This invention does not involve any specific means for housing the electronic and photo apparatus, or the card handling apparatus, and since there are a number of such devices described in the patent literature, such as for example, U.S. Pat. No. 3,571,957, issued Mar. 23, 1971, No. 3,620,590 issued Nov. 16, 1971, No. 3,629,834, issued Dec. 21, 1971, and others, it is not deemed necessary to describe the details of construction or operation, since those are well known to one skilled in the art.

FIG. 1 indicates a card, token, sheet, web or other medium for carrying the specific information required in this invention. For convenience, we will call this means a "card", although, as is well known it can be in any one of many different forms.

There are two principal areas of the access control card, or access card, or control card, or simply card 26, that carry important information. The first space 28 carries indicia which are machine readable. These can be perforations, or embossed characters representing specific information, such as account number or name and address of the card owner, or other information. The group of characters 100, and spaces 102 that make up the indicia represent specific information. The words indicia, or characters, will represent the physical markings on the card, or the specific information they uniquely represent. The indicia on each card issued are all different, and associated with each indicia there is a different unique pattern, which is marked on the card in a second area 30.

The pattern 30 is made up of a random distribution of a plurality of spots, which are microperforations in a thin opaque metal layer. As described in our copending U.S. Pat. No. 3,677,465, the material 98 which carries the pattern 30 can be a thin evaporated layer of metal or a transparent base material such as clear plastic.

For each card carrying its unique pattern 30 there is an identical master pattern of microperforations in a metal layer. This master pattern can be a self supporting metal sheet or film, or a thin metal coating on a transparent plastic base, etc. The microperforations are preferably prepared in the master pattern by means of a pulsed focussed beam of laser radiation of a selected level L1 of intensity.

The patterns 94 in the sheets 98 are precise copies of the master patterns made by superimposing the master pattern material on top of the card material 98, and passing a continuous beam of focussed laser energy through the microperforations in the master pattern, to the underlying metal layer of the sheet 98, and burning microperforations in the same pattern as in the master pattern.

As explained in U.S. Pat. No. 3,677,465, it is necessary that the metal layer of the master pattern be of higher melting point, and/or thicker, than the metal layer of the sheet 98 of the card. Thus, when the intensity of the continuous focussed beam is set at a value of intensity level L2 where L2 is less than L1, this beam will not affect the metal of the master pattern, but will burn holes in the sheet 98.

There is also a third intensity level L3, where L3 is less than L2, which when scanned across the material 98 will not affect the metal layer of the material 98.

On the record card 40 there may be other areas 95, 96, 97, etc. Which may include the signature of the card owner, his picture, or his fingerprint, or other identifying information, which can be further used to authenticate the card and the bearer of the card. Such additional information is well known in the art and forms no part of this invention, and will not be described further.

Referring now to FIG. 2, the card of FIG. 1 is inserted into an opening 32 in a casing 34 that houses a plurality of test or measuring stations. As mentioned above, the particular housing, or means of transport of the card, etc., form no part of this invention and reference is made to the prior art for such details.

The card entered at 32 is transported through passage 36 by means 38, well known in the art, to the First Station 12. Here the card 40 is presented with means 42, well known in the art, for reading the markings 28, and determining the information corresponding to the indicia. This information is sent to a computer means 46, which when it receives the indicia read from the card compares the indicia with a preselected list, bank or tape of indicia, to see if that specific information is listed in the bank or on the tape.

This list could be, for example, all indicia on cards lost, stolen, or otherwise declared invalid. If the specific indicia 93 is found on that list, the card is rejected and falls into a receptacle inside the housing (not shown). If desired, an appropriate notice is given to the person who inserted the card, that it is invalid and is being confiscated. At the same time the indicia read by 42 also goes by line 48 to the Third Station, for a purpose to be described later.

If the indicia read by 42 is not on the list at 46, then the card 40 progresses to the Second Station 16. Here two tests are performed. The first test is to check the nature of the material of the sheet 98. A laser 52 passes light through an intensity control means 54, via beam 56 to a mirror 58 and through an optical means 60 to focus the beam 62 onto the top surface of the material 98. The intensity level is adjusted to the level L3, which is just below the level L2, where it will burn the metal layer. With the level at L3, the beam is scanned across the pattern 30, in accordance with arrows 61.

If the material of the sheet 98 is not for the proper material, for example, if it is a photographic emulsion, then it will not support the beam of intensity level l3, and parts or all of the opaque material 98 will be burned away. When this happens, as the beam is scanned in accordance with the arrows 61, openings in the opaque layer will be formed.

The second test is than applied. This involves passing light from a source 64 through lens 66, through the pattern area 30 to a photoelectric sensor 70. If no light passes, it indicates that the material 98 is satisfactory. If light passes, it indicates that the material 98 is a substitute material, and therefore the card is invalid, and it is confiscated.

If the card 40 passes the tests at Station 2, it then goes to Station 3. Here there is a bank of master patterns. These may be on separate cards or sheets, or may conveniently be on a reel or strip of material 76, with separate frames or areas, each having its unique pattern of microperforations in the metal layer of the strip. Corresponding to each frame, is an index, which corresponds to the indicia of that pattern. Thus, when the First Station reads the indicia, this information goes to control means 74. This control means operates motors 77, 82, which drive reels 78, 81 respectively to position the proper frame, and pattern in an aperture between the rollers 83, 84. Thus the correct master pattern corresponding to the indicia on the card 40 is now displayed in the aperture 87. The control means 74 can be conventional, similar to the many examples of strip films or tapes carrying micropatterns and digital indicia, with means to transport the strip until a desired index is reached, etc.

The card 40 is now sent to the Third Station and positioned so that the pattern 94 is precisely lined up in the aperture 87 so that the two patterns, that is, the master pattern and the card pattern 30, are aligned. Optical means 86, cooperating with sensor means 88 determine if the patterns are identical. If they are not identical, the card 40 is discarded.

The materials of the master pattern and the card pattern are specialized, in that the master material (metal) is of high melting temperature and/or thicker, while the card material (metal) is lower melting temperature and/or thinner. The patterns of microperforations are copied and burned into the card metal by focussed laser beam from the master material. The microperforations in both materials are of exceedingly small size, so that the patterns must be precisely positioned with respect to each other. Reference is made to U.S. Pat. No. 3,677,465 for details on the systems for comparing the two micropatterns. Normal digital reading systems are not practicable since the spots are too small, and the spacing are random. Misalignment of one microperforation by a distance of the order of the diameter, (which may be as small as 0.0005 in.) will cause the comparison means 74 to reject the card.

The purpose of the use of thin metal layers and microperforations, and the transfer of patterns described, is to prevent forged copies from being used. For example, the simplest way to copy the pattern on a card is to make a photographic copy, and that copy (except for changes in dimension) might be used in the comparator 74. However, such a photographic copy will not stand the test of the laser of intensity L3. The only material that will satisfy that test is a metal of the same melting point and thickness as the material 98 used in the card. And the pattern cannot be transferred from the card to the new material by photography. Nor can it be transferred by laser, since the laser of intensity level L2 which would burn microperforations in the new material would also destroy the card material.

However, the pattern could be etched in a suitable metal by photoetching. However, the size of the perforations would not duplicate those of the master card, and this is the reason for the next test.

In FIG. 2 the card 40 is shown connected to motor 104 by means 106. When the motor 104 is started the card will pass at a constant velocity past the master pattern on the strip. In FIG. 3 we have shown (enlarged) the relationship between a microperforation 110 on the master pattern as the corresponding microperforation 112 in the card passes to the right, in the direction of arrow 120. When the two are tangent at 114, light is just beginning to pass through the two microperforations. Consider for simplicity, that the opening 110 is moving to the left. When the leading edge of 110 gets to position 115, the two microperforations are completely superimposed. Then when it gets to 116, there is no more light passing. Thus the two patterns must be relatively traversed by a distance from 114 to 116, equal to the sum of their diameters.

Now, consider that the card pattern has at least one perforation 122 that is oversize. Then the traverse must be over a distance from 114 to 118, (again the sum of their diameters) which will be larger than the distance 114 to 116. There are well known techniques for measuring small distances, such as measuring time of transverse, etc., this would be done in means 92. Thus it will not be necessary to provide more details since the specific means forms no part of this invention.

If the pattern comparison is okay and the test of size is okay, then the card will have passed all tests, and the card is validated and the operative means 22 is energized to provide the requested access. No detail is provided for the mechanism 22, which can be as simple as a relay to open a locked gate, or as complicated as a device for dispensing currency, providing access to a computer or to a cable TV circuit, credit purchase, etc., since these specific means form no part of this invention and are well known in the art.

While we have indicated means to check the validation of the pattern, and have indicated other means to test the authenticity of the card itself, it will be clear that the apparatus can be operated without carrying out all of the tests.

It will be clear also, that while we call the patterns or the strip 76 the "master patterns," these can be copies of other master patterns in materials of still greater thickness and/or higher melting point.

In the drawing, FIG. 2 illustrates the system as a plurality of successive stations or operations on the control card. The area of the card devoted to indicia is separate from the area devoted to micropattern, and it is clear that the means to read and the means to compare may be situated within the outer boundary of the card. Thus the card need only be positioned in a single location.

Our disclosed invention includes an access control system for selectively controlling access on presentation and authentication of a control card. This card comprises card means, machine readable indicia carried thereby, and unique coded micropattern means thereon. The card authentication means comprises means to read the indicia, and a bank of authenticating master coded micropatterns. Selecting means, responsive to the means to read the indicia, selects the master coded micropattern from the bank corresponding to the coded micropattern on the card means; and means to compare the coded micropatterns on said card means with the master authentication micropattern selected from the bank in response to the read indicia.

The system may further include operative means responsive to said comparison means, said operative means including means to authorize access when the compared patterns correspond. A preferred form includes coded micropattern means comprising an array of microperforations; and the coded micropattern means may include redundant coded patterns.

The system as described above in which said card micropattern is transferred from said master micropattern by focussed laser means of intensity level L2; and including means to scan across said card micropattern with a focussed laser beam of intensity level L3, where L3 is less than L2.

The microperforations may be burned in said master pattern in a metal layer of first melting point and first thickness by scanning with a focussed laser beam of intensity level L0 through microperforations in a super-master pattern in a third layer of third melting point and third thickness, where L0 is higher than L2.

Also the system includes means, responsive to said means to read said indicia, to compare said indicia with a preselected list of indicia; and the master micropattern is in a first layer of first melting point and first thickness, and said card micropattern is in a second metal layer of second melting point and second thickness, and said first melting point may be higher than said second melting point and said first thickness may be greater than said second thickness.

The system includes means to compare the sizes of the microperforations in said card micropattern with the sizes of the microperforations in the master pattern.

The fundamental basis of this invention lies in the use of a card having a machine readable indicium and a unique pattern, and a bank having a plurality of indicia and corresponding patterns, and means responsive to the read indicium on the card to select the corresponding pattern, and means to compare the selected pattern and the card pattern.

In this invention the unique pattern is a micropattern of microperforations which can not be read by eye, and not by machine, except by the optical comparison with the bank pattern. To do this the card must be presented where there is a bank of patterns.

Another method in which the pattern is unique and not readable except by selection of a particular pattern in the bank, is to use a photographic hologram on the card, and in the bank a corresponding coded reference beam (see our U.S. Pat. No. 3,807,828). When the hologram on the card is exposed to the coded reference beam, since the hologram was made with that specific coded reference beam, the hologram will be reconstructed and an image of the object of the hologram will be formed. This object could be a point, or plurality of points, of light falling on PE sensors, etc.

Both the hologram card and the micropattern card have great security because of their permanent complex patterns which cannot easily be duplicated. However, they have the limitation that they must be presented adjacent a bank.

There is another type of pattern, such as a magnetic code pattern or a machine readable card, that comprises a series of time spaced pulses, or bit pattern. These can easily be transmitted from a distant reading station to a bank (computer memory) for comparison be well known digital means. However, the magnetic card pattern is not secure, since anyone finding the card can read the pattern and make a corresponding facsimile, by means of which they can enter the bank. This system can be used at great distances from the bank, but has the disadvantage of poor security.

The security can be greatly improved by changing the pattern on the card and in the bank each time the card is used. Thus, the pattern is continually being changed from one to another unique bit pattern, so that a copied card cannot be used unless it is presented before the next use of the original card. Also, the unauthorized use is quickly detected because once the unauthorized card is used, the true or original card cannot be used since the pattern in the bank has been changed, by the use of the authorized card.

While the invention has been described with a certain degree of particularity it is manifest that many changes may be made in the details of construction of the arrangement of components, it is understood that the invention is not to be limited to the specific embodiments set forth herein by way of exemplifying the invention, but the invention is to be limited only by the scope of the attached claim or claims, including the full range and equivalency to which each element or step thereof is entitled.

Embodiments of our invention include an access security system for monitoring access by authentication of a control member or presentation which includes a bank of unique authenticating master coded micropatterns of micro altered areas of web means, together with a corresponding group of macropatters of machine readable indicia, each of the macro indicia corresponding to selected micropatterns and providing an index thereto, and a plurality of control members, each such member having at least one of said macropatterns of machine readable indicia and the corresponding coded micropattern of micro altered areas. Means are included for authenticating the presented control member, such means comprising means for reading the macro patterns, means responsive to the reading means, including means for selecting the corresponding micropattern from said bank indexed by said macro indicia; and means for comparing the micropattern on said member with the indexed micropattern in said bank.

The disclosed access security system may also include means for authorizing access when the compared micropatterns correspond; and means for the delivery of an item identified by the coded micropattern, and wherein the item delivered may commmprise currency.

Further embodiments of our invention include means for comparing an array of at least two micropatterns on the control member, and wherein the macro indicia indexes a corresponding series of micropatterns in the bank; also the micropattern of micro altered areas may comprise an holographic record, with the holographic record being, for example, a photographic hologram adapted to be reconstructed by a coded reference beam.

Another improved access security system includes a plurality of micropatterns in a first array on a control member, means for recognizing the array of micropatterns present, means for reading the micropatterns in the array, and means for substituting for at least one of said micropatterns another micropattern from said bank to provide a second array, whereby the coded security access afforded by the unique control member is revised on each authorized presentation of said member.

A further feature of our access security system is one wherein the micropattern of micro altered areas comprises a series of magnetic spots, and the additional means for changing the arrays thereof on the control member and for recording the change in the bank, the changes being indexed by the macro indicia recognition.

An additional embodiment provides a further means for changing the pattern on the control member and in the bank each time the member is presented, whereby the micropattern is sequentially changed from one to another unique master coded micropattern, thereby precluding the unauthorized use of a facsimile after the next authorized presentation of the original member.

The sequential changes are recorded in the bank and can provide a record of presentations and transactions, and in addition provide a means for security updating of the control member whether or not a transaction is involved.

We claim:

1. An access security system for monitoring access by authentication of a control member on presentation comprising
   (a) a bank of unique authenticating master coded micropatterns of micro altered areas of web means and a corresponding group of macropatterns of machine readable indicia, each indicia corresponding to selected micropatterns and providing an index to the corresponding micropattern;
   (b) a plurality of control members, each such member having at least one of said macropatterns of machine readable indicia and the corresponding coded micropattern of micro altered areas; and
   (c) means for authenticating a presented control member comprising
      (1) means for reading said macropatterns,
      (2) means responsive to said means for reading, including means for selecting the corresponding micropattern from said bank indexed by said macro indicia; and
      (3) means for comparing the micropattern on said member with the indexed micropattern in said bank.

2. The access security system of claim 1 which includes means for authorizing access when the compared micropatterns correspond.

3. The access security system of claim 1 including operative means responsive to the means for authenticating adapted for the delivery of an item identified by the coded micropattern.

4. The access security system of claim 3 wherein the item identified comprises currency.

5. The access security system of claim 1 which includes means for comparing an array of at least two micropatterns on the control member, and wherein the macro indicia indexes a corresponding series of micropatterns in the bank.

6. The access security system of claim 1 including a plurality of micropatterns in a first array on a control member, means for recognizing the array of micropatterns present, means for reading said micropatterns in said array, and means for substituting for at least one of said micropatterns another micropattern from said bank to provide a second array, whereby the coded security access afforded by the unique control member is revised on each authorized presentation of said member.

7. The access security system of claim 6 wherein the micropattern of micro altered areas comprises a series of magnetic spots, and the additional means for changing the arrays thereof on the control member and for recording the change in the bank, the changes being indexed by the macro indicia recognition.

8. The access security system of claim 1 wherein the micropattern of micro altered areas comprise an holographic record.

9. The access security system of claim 7 wherein the holographic record is a photographic hologram adapted to be reconstructed by a coded reference beam.

10. The access security system of claim 1 which includes the additional means for changing the pattern on the control member and in the bank each time the member is presented, whereby the micropattern is sequentially changed from one to another unique master coded micropattern, thereby precluding the unauthorized use of a facsimile after the next authorized presentation of the original member.

11. A system for access control, for selectively granting access on presentation and authentication of a control token, said system comprising:
   A. a bank comprising
      (1) storage means for storing a plurality of unique authenticating master coded bit patterns, each in different address locations;
      a plurality of address locations in said storage means, each address being an index of the bit pattern stored therein;
   B. a plurality of control tokens, each control token comprising
      (1) a unique object;
      (2) means on said object for storing in machine readable form an unique index;
      (3) means on said object for storing in machine readable and machine writeable form an unique coded bit pattern;
      (4) each of said control tokens having one of said unique indicia and the corresponding unique authenticating coded bit patterns stored in said bank;
   C. reading means to which a control token can be presented, said reading means including first means to read said indicium, and second means to read said coded bit pattern on said token;
   D. means responsive to said first means to select from said bank said coded bit pattern corresponding to said indicium; and
   E. means to compare the unique bit pattern read from said token with the stored bit pattern in said bank corresponding to the read indicium.

12. The system of claim 11 wherein said coded bit patterns comprise optical holograms.

* * * * *